(12) United States Patent
Druding et al.

(10) Patent No.: US 7,813,107 B1
(45) Date of Patent: Oct. 12, 2010

(54) WET TANTALUM CAPACITOR WITH MULTIPLE ANODE CONNECTIONS

(75) Inventors: J. Michael Druding, Orchard Park, NY (US); Douglas P. Eberhard, Grand Island, NY (US); Jason Hahl, Cheektowaga, NY (US); Yanming Liu, Clarence Center, NY (US); Donald Monroe, Corfu, NY (US); Barry C. Muffoletto, Alden, NY (US); Edward J. Gloss, Clarence Center, NY (US)

(73) Assignee: Greatbatch Ltd., Clarence, NY (US)

( * ) Notice: Subject to any disclaimer, the term of this patent is extended or adjusted under 35 U.S.C. 154(b) by 438 days.

(21) Appl. No.: 12/045,798

(22) Filed: Mar. 11, 2008

Related U.S. Application Data (60) Provisional application No. 60/894,978, filed on Mar. 15, 2007.

(51) Int. Cl.
H01G 9/04 (2006.01)
(52) U.S. Cl. .................. 361/508; 361/509; 361/511; 361/516; 361/517; 361/541
(58) Field of Classification Search .............. 361/508, 361/509–512, 516–517, 540–541, 523–529; 29/25.01, 25.03
See application file for complete search history.

(56) References Cited

U.S. PATENT DOCUMENTS

| | | | |
|---|---|---|---|
| 3,686,535 A | 8/1972 | Piper | |
| 4,447,852 A | 5/1984 | Clement | |
| 4,916,576 A | 4/1990 | Herbert et al. | |
| 5,584,890 A | 12/1996 | MacFarlane et al. | |
| 5,922,215 A | 7/1999 | Pless et al. | |
| 5,963,418 A | 10/1999 | Greenwood, Jr. et al. | |
| 6,110,233 A | 8/2000 | O'Phelan et al. | |
| 6,185,091 B1 | 2/2001 | Tanahashi et al. | |
| 6,249,423 B1 | 6/2001 | O'Phelan et al. | |
| 6,411,494 B1 | 6/2002 | Watt | |
| 6,597,564 B2 | 7/2003 | O'Phelan et al. | |
| 6,648,928 B2 * | 11/2003 | Nielsen et al. | 29/25.03 |
| 6,699,767 B1 * | 3/2004 | Huntington | 438/396 |
| 6,709,946 B2 | 3/2004 | O'Phelan et al. | |
| 6,801,424 B1 * | 10/2004 | Nielsen et al. | 361/517 |
| 6,850,405 B1 * | 2/2005 | Mileham et al. | 361/302 |
| 7,072,171 B1 * | 7/2006 | Muffoletto et al. | 361/508 |
| 7,085,126 B2 * | 8/2006 | Muffoletto et al. | 361/517 |
| 7,092,242 B1 * | 8/2006 | Gloss et al. | 361/523 |
| 7,160,615 B2 * | 1/2007 | Iwaida et al. | 428/403 |
| 7,203,055 B2 * | 4/2007 | Shin et al. | 361/306.3 |
| 7,271,994 B2 * | 9/2007 | Stemen et al. | 361/508 |
| 7,511,943 B2 * | 3/2009 | Fife et al. | 361/516 |
| 2004/0105212 A1 | 6/2004 | O'Phelan et al. | |
| 2004/0173835 A1 | 9/2004 | Schmidt et al. | |
| 2005/0017888 A1 | 1/2005 | Sherwood et al. | |
| 2005/0264979 A1 | 12/2005 | Breyen et al. | |

* cited by examiner

Primary Examiner—Nguyen T Ha
(74) Attorney, Agent, or Firm—Michael F. Scalise (57) ABSTRACT

A capacitor assembly comprising a casing, an anode pack housed within the casing and comprising two or more anode pellets of anode active material electrically connected to each other by a bridge, and a cathode comprised of cathode current collectors including major faces with cathode active material provided thereupon is described. The bridge, which spans between sidewalls of the anode pellets, helps maintain them in a parallel alignment. The bridge is also a convenient location to connect the feedthrough wire that exits the casing through a glass-to-metal seal. The cathode current collectors are disposed between adjacent anode pellets and are electrically connected to each other and to the casing. A feedthrough wire electrically connected to the anode pack extends outside the casing in electrical isolation there from. An electrolyte is provided to activate the anode and the cathode.

27 Claims, 8 Drawing Sheets

WET TANTALUM CAPACITOR WITH MULTIPLE ANODE CONNECTIONS

CROSS-REFERENCE TO RELATED APPLICATION

This application claims priority from U.S. Provisional Application Ser. No. 60/894,978, filed Mar. 15, 2007.

BACKGROUND OF THE INVENTION

1. Field of the Invention

The present invention relates generally to a capacitor, and more particularly, to a capacitor with multiple anodes connected to a common terminal inside the capacitor casing. This makes the present capacitor more readily adaptable to automated manufacturing techniques. The goal is to build highly reliable capacitors at a reduced unit cost through an improved connection of multiple anodes before they are associated with a cathode.

2. Description of Related Art

As more and more medical applications are investigated and implemented to aid and assist the human body, devices needed to deliver the desired therapy are becoming increasingly more sophisticated, both functionally and in terms of their structural makeup. Modern implantable devices require power sources that are smaller in size, but powerful enough to meet the therapy requirements. For example, a cardiac defibrillator has a battery powering circuits performing such functions as, for example, the heart sensing and pacing functions. This requires electrical current of about 1 microampere to about 100 milliamperes. From time-to-time, the cardiac defibrillator may require a generally high rate, pulse discharge load component that occurs, for example, during charging of a capacitor assembly in the defibrillator for the purpose of delivering an electrical shock to the heart to treat a tachyarrhythmia, the irregular, rapid heartbeats that can be fatal if left uncorrected. This requires electrical current of about 1 ampere to about 4 amperes.

The current trend in medicine is to make cardiac defibrillators, and like implantable devices, as small and lightweight as possible without compromising their power. This, in turn, means that capacitors contained in these devices must be readily adaptable in how they are connected to each other as well as to the battery and the device circuitry. In that light, a number of patents and publications disclose electrical energy storage devices including capacitors having a dual anode structure.

One is U.S. Pat. No. 6,850,405 to Mileham et al., which is assigned to the assignee of the present invention and incorporated herein by reference. This patent relates to a design that provides two anodes with associated feedthrough wires having their own glass-to-metal seals. As long as they are electrically insulated from each other, the feedthrough wires can also be combined into one glass-to-metal seal. One embodiment has the two anode feedthrough wires left unconnected outside the capacitor. In another, they are joined externally of the capacitor casing. Several interconnect designs are described, none of which include a connection of the anode leads within the capacitor casing.

U.S. Pat. No. 7,012,799 to Muffoletto et al., which is also assigned to the assignee of the present invention and incorporated herein by reference, describes an enclosure for a wet tantalum electrolytic capacitor or for an electrochemical cell such as a lithium/silver vanadium oxide cell. In one embodiment, the capacitor comprises a metallic enclosure of a first drawn portion, and a second stamped cover. The enclosure houses two anodes in a side-by-side relationship. Each anode includes an embedded anode wire weld contacted to an anode lead electrically insulated from the casing by a glass-to-metal seal. The anode wires are not connected within the capacitor casing.

U.S. Pat. No. 6,679,926 to Kajiura et al., which is incorporated herein by reference, describes a lithium secondary battery including a cathode of a porous sintered material made of a lithium-transition metal oxide in electrochemical association with several pairs of anodes made of a sintered material joined onto a rectangular anode current collector. The anode current collector has a strip-shaped anode lead that protrudes at one end thereof. In an electrode assembly, a plurality of extending anode leads is bundled into an anode-connecting conductor welded onto an anode terminal via an insulation plate.

U.S. patent application Ser. No. 11/615,410 Ziarniak et al., which is assigned to the assignee of the present invention and incorporated herein by reference, discloses a capacitor comprising a casing of first and second casing members, a feedthrough wire electrically insulated from the casing and extending there from, first and second anodes electrically connected to each other within the casing by an anode wire extending between them, a cathode, and an electrolyte. A second anode wire connects either to the first anode wire and serves as the feedthrough wire passing through a glass-to-metal seal or it connects to one of the anodes themselves before subsequently connecting to the feedthrough wire.

However, the Ziarniak et al. patent application requires that the anode wires are embedded within the anode pellets during the pressing process. This makes the pressing process relatively difficult to automate. In an alternative embodiment, the anode wires are welded to the peripheral edges of the anode pellets. This secondary operation is also difficult to automate, and increases manufacturing cycle time. For both of these embodiments, after wire bonding of the anode pellets to each other, it is also difficult to accurately position the anodes when assembling them with a corresponding cathode foil and separator material.

What is needed, therefore, is a capacitor having multiple anode pellets that can be formed simultaneously using automated equipment, connected together with highly accurate positioning, and easily assembled with a corresponding cathode into an anode/cathode assembly.

SUMMARY OF THE INVENTION

The present invention meets this need by providing a capacitor comprising a casing including first and second casing members secured to each other, an anode pack housed within the casing and comprising two or more anode pellets of anode active material electrically connected to each other by a bridge, and a cathode comprised of cathode current collectors including major faces with cathode active material provided thereupon. The cathode current collectors are electrically connected to each other and to the casing. A feedthrough wire electrically connected to the anode pack extends outside the casing and is electrically isolated therefrom by a glass-to-metal seal. An electrolyte is provided within the casing, contacting the cathode and the anode.

In one embodiment, the anode pack is comprised of two anode pellets of anode active material connected together by the bridge. The anode pellets each comprise respective first and second surrounding sidewalls extending to spaced apart major anode face walls. The anode pellets are aligned in a generally parallel relationship with the bridge spanning from the first anode pellet surrounding sidewall to the second anode pellet surrounding sidewall and oriented generally perpendicular to the respective spaced apart major anode face walls.

The cathode is comprised of a first cathode current collector disposed between the first casing member and the first anode, and including a first major face provided with cathode active material thereupon opposed to the first anode; a second cathode current collector disposed between the first and second anodes and having opposed first and second major faces provided with cathode active material thereon; and a third cathode current collector disposed between the second casing member and the second anode, and including a first major face provided with cathode active material thereupon opposed to the second anode.

It will be apparent that further analogous embodiments of the present invention may be provided with the anode pack comprising more anodes, and the cathode comprising more cathode current collectors supporting cathode active material. In general, such configurations will have N anodes and (N+1) cathode current collectors.

In another embodiment, the capacitor assembly may be provided in a configuration wherein the anode pack is comprised of N anodes, and the cathode is comprised of (N−1) current collectors supporting cathode active material, wherein N is at least 2. In that case, the face walls of each of the casing members are provided with cathode active material. Functionally, this configuration results in a capacitor assembly similar to the one having N anodes and (N+1) cathode current collectors. For example, such a capacitor assembly may be comprised of an anode pack including three anodes. A first part of the corresponding cathode is comprised of a first cathode current collector disposed between the first and second anodes and having opposed first and second major faces provided with cathode active material thereon. The remainder of the cathode is comprised of the face wall of the first casing member provided with cathode active material opposing the outer face of the first anode, and the face wall of the second casing member provided with cathode active material opposing the outer face of the second anode.

The feedthrough wire of the capacitor assembly may be electrically connected to the bridge of the anode pack. Alternatively, the feedthrough wire may be connected to one of the anodes. In one embodiment, the first anode includes a plate electrically connected to an anode face wall, and the feedthrough wire is electrically connected to the plate.

The first casing member may include a first face wall joined to a surrounding sidewall, and the second casing member may include a second face wall secured to the surrounding side wall of the first casing member. The second casing member may also include a surrounding sidewall secured to the surrounding sidewall of the first casing member. In order to fully isolate the anode pack from the casing, an insulating ring may be disposed between the surrounding sidewall of the first casing member and the anode/cathode assembly.

The current collectors of the cathode may be formed as a unitary structure from a single piece of foil. In one preferred configuration, the foil is folded in a serpentine arrangement, with each of the current collectors connected to its neighboring ones by a narrow band of the foil. Each of the current collectors is preferably also enclosed in a separator comprised of a sealed pouch of polymer fabric or porous film.

The anode active material may be selected from the group consisting of tantalum, aluminum, titanium, niobium, zirconium, hafnium, tungsten, molybdenum, vanadium, silicon, germanium, and mixtures and alloys thereof. The cathode active material may be selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead, gold, silver, and mixtures, oxides and nitrides thereof.

Also according to the present invention, a method for making a capacitor assembly is provided, comprising the steps of providing a casing comprising a first casing member including a first face wall joined to a surrounding side wall and a second casing member including a second face wall; providing an anode pack comprising a first anode of anode active material, a second anode of anode active material, and a bridge electrically connected to the first and second anodes; and connecting a feedthrough wire to the anode pack. A cathode is provided in electrical association with the anode pack to form an anode/cathode assembly. The cathode is comprised of first, second and third cathode current collectors having major faces, selected ones of which are provided with cathode active material. The first current collector is adjacent to the first anode, the second current collector is between the first and second anodes, and the third current collector is adjacent to the second anode.

The anode/cathode assembly is then positioned inside the first casing member with the feedthrough wire extending outside thereof, electrically insulated from the first casing member. The cathode is electrically connected to the casing. The first casing member is secured to the second casing member to provide an enclosure containing the anode/cathode assembly. An electrolyte is provided inside the casing to operatively associate the cathode with the first and second anodes.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which.

The present invention will be described in connection with preferred embodiments, however, it will be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

For a general understanding of the present invention, reference is made to the drawings. In the drawings, like reference numerals have been used throughout to designate identical elements.

As used herein, the term "bridge" refers to a metal structure in the form of a relatively long narrow piece of a conductive material in the form of a strip comprising a thin edge extending to opposed major sides that are substantially wider than the edge. The major sides of the bridge are sized so that they extend lengthwise along only a minor portion of a surrounding edge formed between the opposed major faces of an anode pellet. The bridge spans between the sidewalls of at least two immediately adjacent anode pellets. In addition to electrically connecting them together, the bridge helps maintain proper alignment and spacing of the anode pellets so that a cathode can then be fit into the space between adjacent pellets and between an anode pellet and a casing sidewall. The bridge is not a piece of wire having a circular cross-section.

Figure 1:
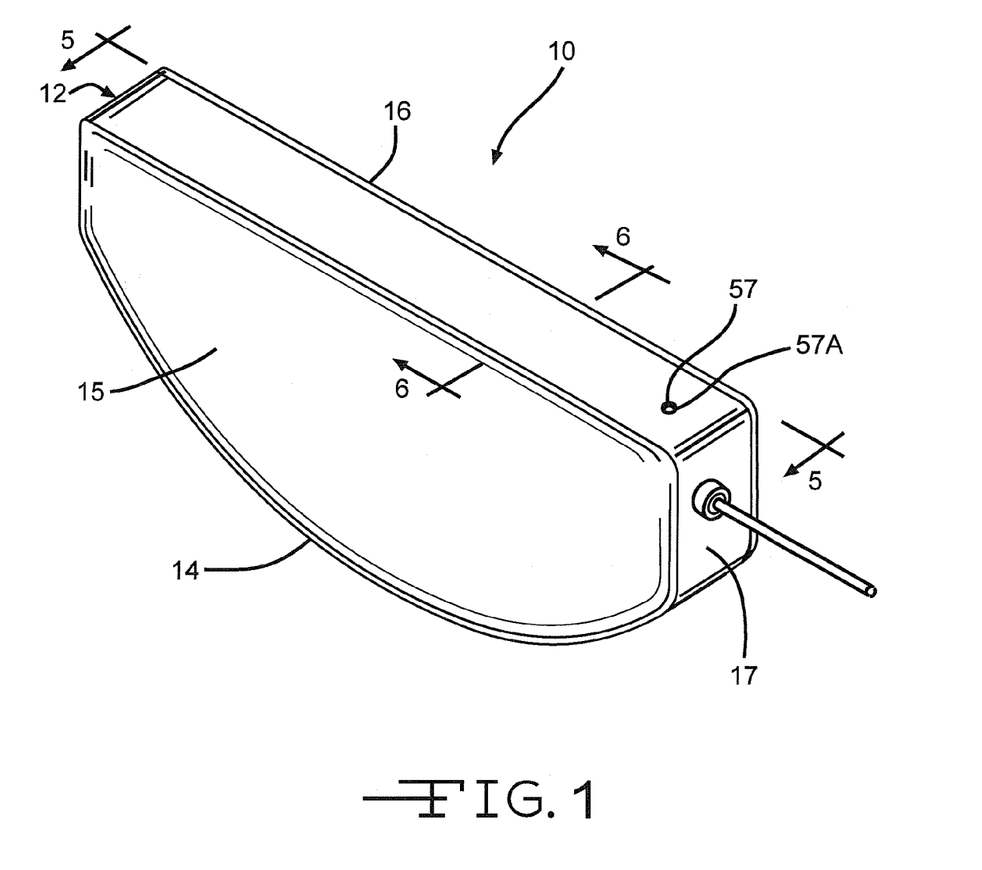
FIG. 1 is a perspective view of a capacitor 10 according to the present invention.

Turning now to the drawings, FIG. 1 is a perspective view of a capacitor according to the present invention. The capacitor 10 is comprised of a casing 12 including first and second casing members 14 and 16 secured to each other. An anode pack is housed within the casing. The anode pack is comprised of two or more anode pellets of anode active material electrically connected to each other by a bridge. A cathode is electrically associated with the anode and is comprised of cathode current collectors including major faces with cathode active material provided or supported on selected faces thereof. The first casing member 14 includes a first face wall 15 joined to a surrounding side wall 17. The second casing member 16 is a plate-shaped member comprising a second face wall 19 (FIG. 6) secured to the surrounding side wall 17 of the first casing member 14.

Figure 5:
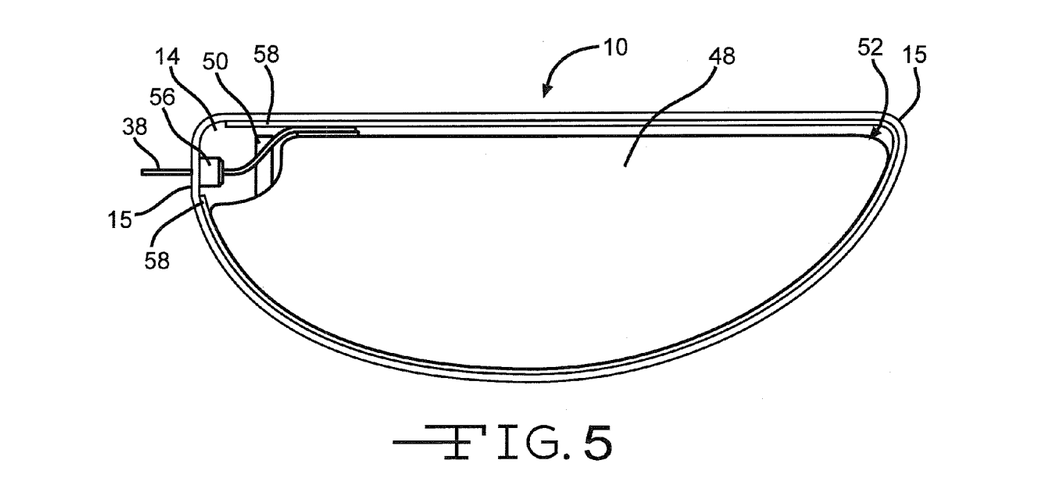
FIG. 5 is a side elevation view taken along line 5-5 of FIG. 1.
Figure 6:
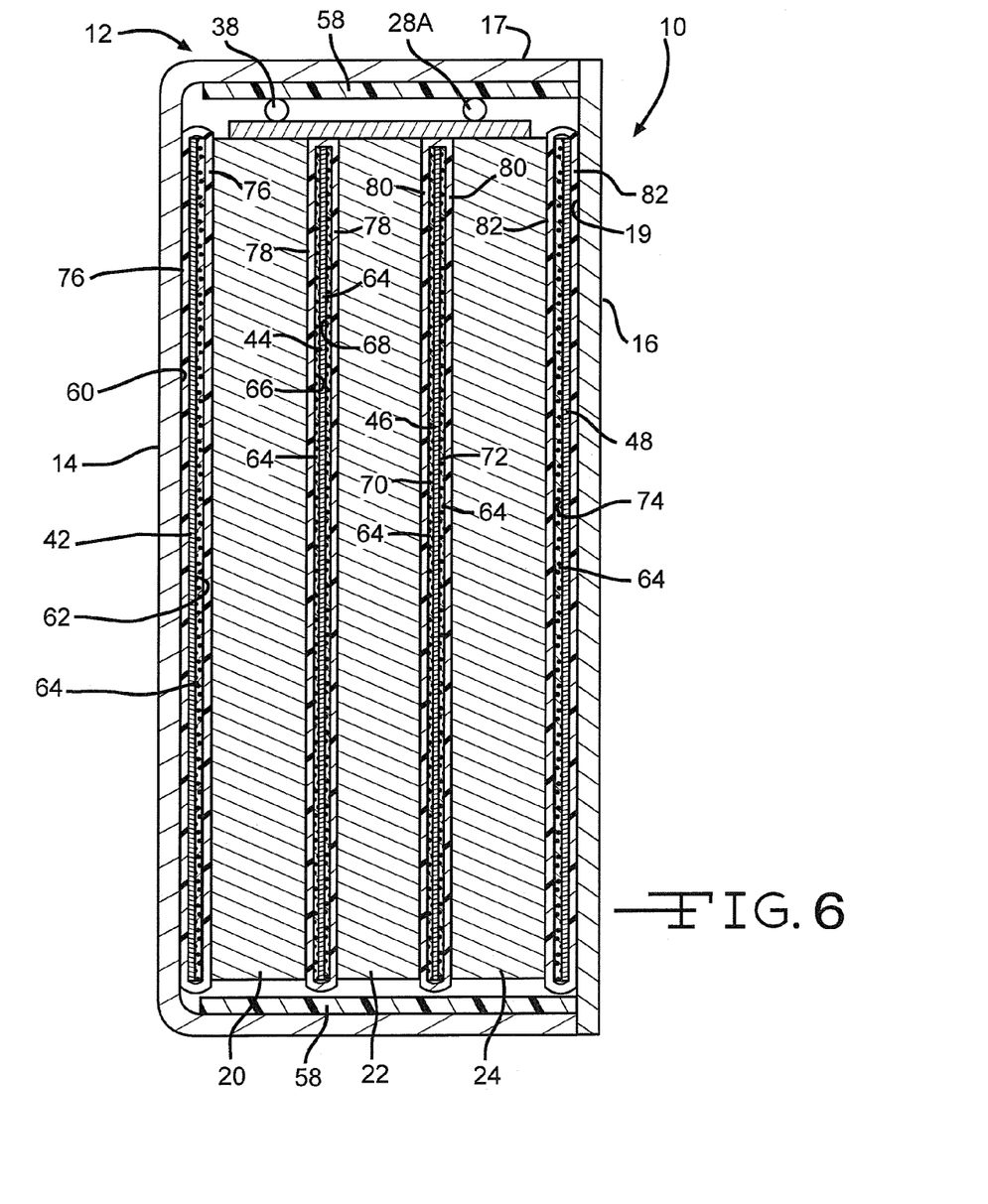
FIG. 6 is a cross-sectional view taken along line 6-6 of FIG. 1.

The configuration of casing 12 may differ from that which is shown in FIGS. 1, 5 and 6. For example, the casing 12 may have different shapes, such as a rectangular shape, a triangular shape, or wedge shape having two planar sides and a third arcuate side. The second casing member 16 may optionally include a surrounding side wall (not shown) secured to the surrounding side wall 17 of the first casing member 14. The casing members may include flanged or flared structures where they are joined together. For a more detailed discussion regarding various casing constructions adaptable to the present capacitor, reference is made to U.S. Pat. No. 7,012,799 to Muffoletto et al. This patent is assigned to the assignee of the present invention and incorporated herein by reference.

Figure 2:
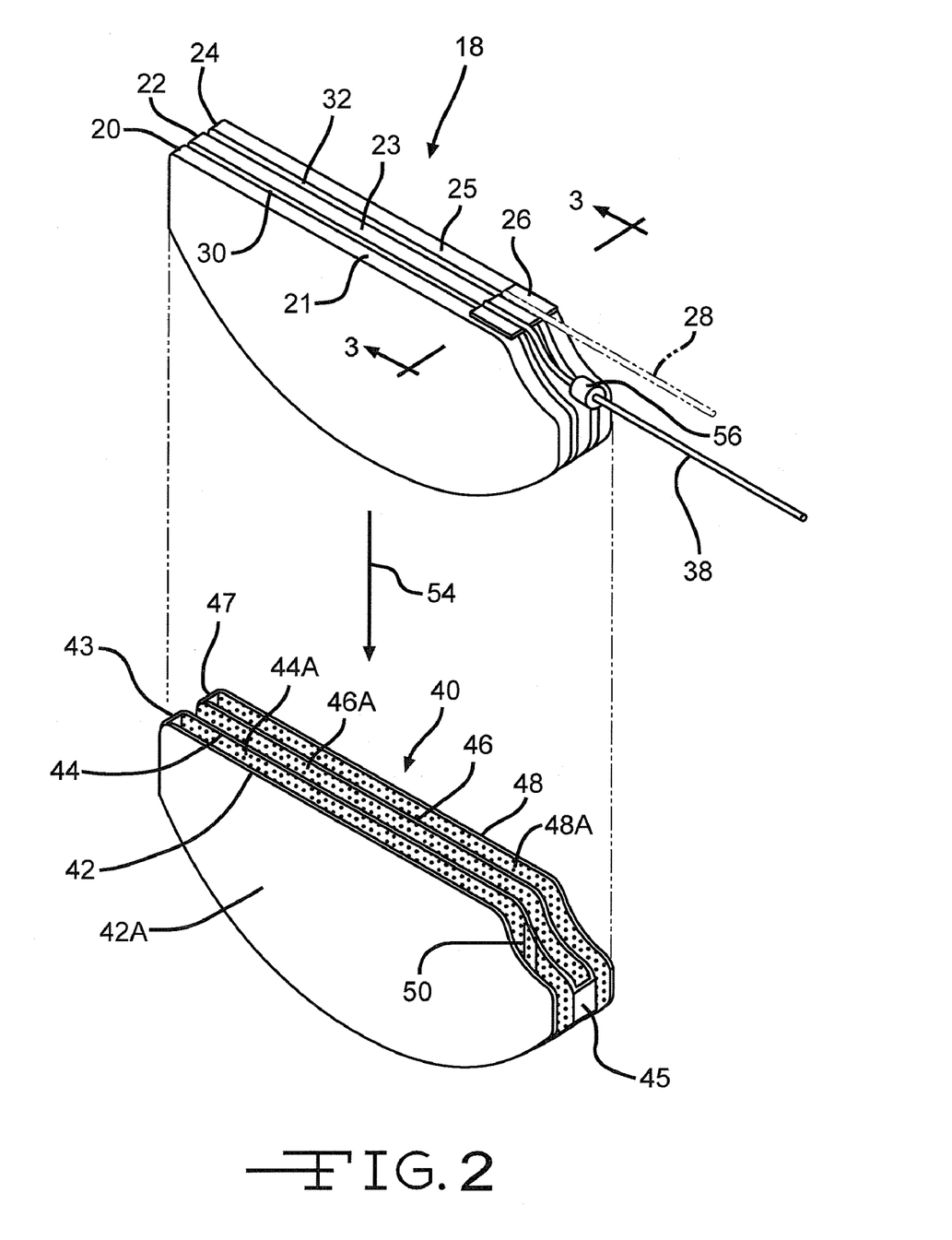
FIG. 2 is a perspective view of an anode pack 18 and a cathode 40 used in the capacitor 10.
Figure 3:
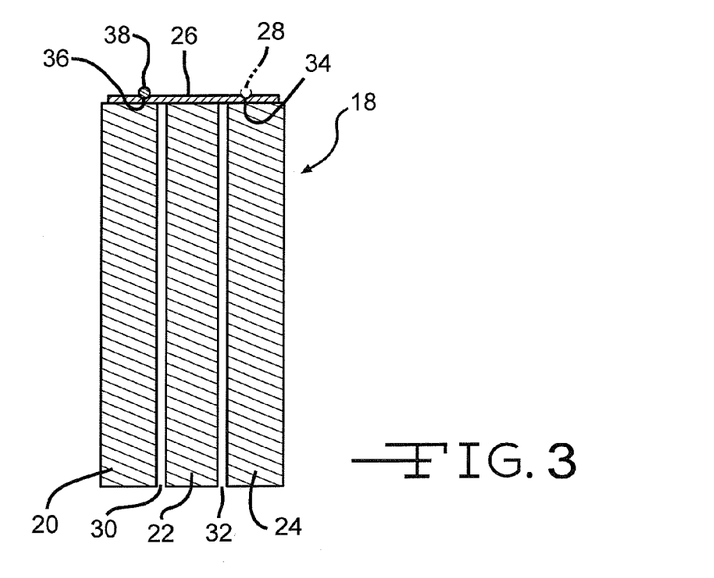
FIG. 3 is a cross-sectional view taken along the line 3-3 of FIG. 2.
Figure 3A:
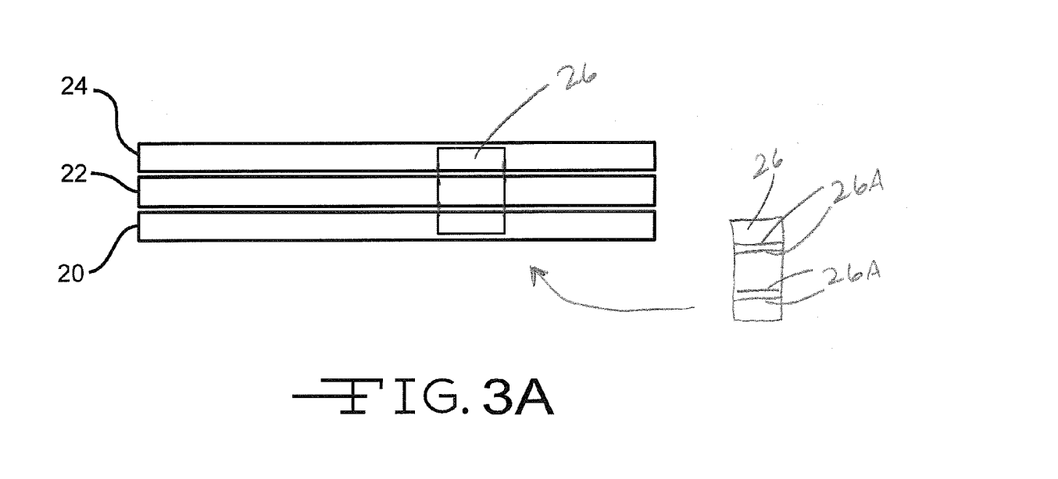
FIG. 3A is a plan view of the anode pack 18 shown in FIG. 3.

One preferred embodiment of capacitor 10 is shown in FIGS. 2 to 6. Referring first to FIGS. 2 and 3, anode pack 18 is comprised of three anodes 20, 22 and 24 of anode active material connected together by a bridge 26. The anode active material of the respective anodes 20, 22 and 24 is typically of a metal selected from the group consisting of tantalum, aluminum, titanium, niobium, zirconium, hafnium, tungsten, molybdenum, vanadium, silicon, germanium, and alloys and/or mixtures thereof in the form of a pellet. As is well known by those skilled in the art, the anode metal in powdered form, for example tantalum powder, is compressed into a pellet. The anode pellet is sintered and then subjected to an anodizing or formation process before incorporation into a capacitor.

The anode pellets of the present invention are advantageous over those typically used in prior art capacitors. The present anode pellets do not require that a wire be embedded within each of them. Typically, an anode wire is embedded in the pressed powder or welded to the pressed pellet prior to the sintering and anodization steps. This is time consuming and not readily adaptable to automated manufacturing of anode pellets. Since the anode pellets 20, 22 and 24 are made without wire connections; they are more adaptable to an automatable pelletizing process.

As previously discussed, the anode pellets are sintered, which typically occurs under a vacuum at high temperature. Bridge 26 is then welded to the sintered pellets. A temporary wire 28 is tack welded by a laser or other suitable welding means to the bridge 26 for performing the anodization step. The anode pack 18 comprising the anode pellets 20, 22 and 24, bridge 26, and temporary wire 28 is formed to a desired voltage to produce an oxide layer over the entire structure. A method and apparatus for anodizing a porous valve metal pellet in a flowing liquid electrolyte is disclosed in U.S. Patent Application Pub. No. 2007/0125658 to Goad et al. This application is assigned to the assignee of the present invention and incorporated herein by reference. Subsequently, the temporary wire is cut off, leaving a short stub 28A (FIG. 6) on bridge 26. Alternatively, the tack weld may be cut, and the entire temporary wire 28 removed from the bridge 26.

The bridge 26 is preferably formed of a small thin plate made of the same metal as is used for anodes 20, 22 and 24. As shown in FIGS. 2 to 4 and 6, the bridge 26 is limited in its lengthwise direction and extends along only a small portion of the surrounding edges 21, 23 and 25 of anodes 20, 22 and 24, respectively.

The bridge 26 is advantageous because it precisely positions the anodes 20, 22 and 24 with respect to each other. As a result, the spaces 30 and 32 between the anodes 20, 22 and 24 are more uniform, and better suited for precisely receiving the cathode current collectors with cathode active material therein. Additionally, once bridge 26 is joined to the anodes 20, 22 and 24, it holds them more rigidly in this position during the process of engaging the cathode with the anode pack. A capacitor 10 produced in this manner can be made with higher throughput and lower cost, and has more uniform electrical properties across the entire electrode active surfaces.

The bridge 26 may also be provided with etched or engraved registration marks 26A for verifying proper alignment with anodes 20, 22 and 24 prior to and during welding thereto. Additionally, the bridge 26 may be provided with grooves 34 and 36 for receiving the temporary wire 28 and the feedthrough wire 38 prior to wire welding.

Figure 4:
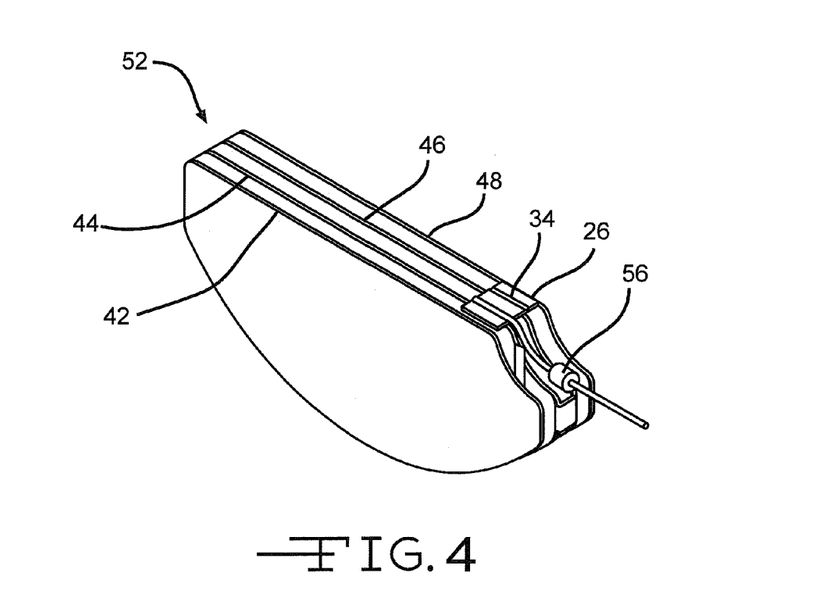
FIG. 4 is a perspective view of the anode pack 18 and the cathode 40 of FIG. 2, shown assembled together.

Referring now to FIGS. 2 and 4, the cathode 40 is comprised of a first cathode current collector 42, a second cathode current collector 44, a third cathode current collector 46 and a fourth cathode current collector 48. Cathode current collectors 42, 44, 46 and 48 are provided with cathode active material 42A, 44A, 46A and 48A, respectively, supported or otherwise provided on the major faces thereof, as will be described subsequently herein.

The current collectors 42, 44, 46 and 48 are preferably formed as a unitary structure from a single piece of metal foil. In one configuration depicted in FIG. 2, the foil is folded in a serpentine arrangement, with each of the current collectors connected to its neighboring ones by a narrow band of the foil. Current collector 42 is connected to current collector 44 by band 43, current collector 44 is connected to current collector 46 by band 45, and current collector 46 is connected to current collector 48 by band 47. A tab 50 extends from the current collector 42. This tab 50 will subsequently be welded to first casing member 14 to electrically connect the cathode 40 to the casing 12.

In an alternative configuration (not shown), the first pair of current collectors 42 and 44 can be formed in a U-shape from a first piece of foil, and the second pair of current collectors 46 and 48 can be formed in a U-shape from a second piece of foil. Both of current collectors 42 and 46 include a tab. The tab of current collector 42 is first connected to casing 12. Then, the tab of current collector 46 is bent and welded to either current collector 42 or 44 so that the current collectors 42, 44, 46 and 48 are all electrically connected together.

Each of the current collectors 42, 44, 46 and 48 supporting the cathode active material 42A, 44A, 46A and 48A are preferably enveloped in a separator comprised of a sealed pouch of polymer fabric or porous film. Prior to bending of cathode collectors into the serpentine configuration depicted in FIG. 2, each of the current collectors 42, 44, 46 and 48 is placed between sheets of separator material. The separator material is heat sealed and cut according to known methods, thereby forming pouches of separator material enveloping each of the cathode current collectors.

The separators prevent an internal electrical short circuit between the anode and cathode active materials in the assembled capacitor 10 and have a degree of porosity sufficient to allow flow therethrough of the working electrolyte during the electrochemical reaction of the capacitor 10. Illustrative separator materials include woven and non-woven fabrics of polyolefinic fibers including polypropylene and polyethylene, or fluoropolymeric fibers including polyvinylidene fluoride, polyethylenetetrafluoroethylene, and polyethylenechloro-trifluoroethylene laminated or superposed with a polyolefinic or fluoropolymeric microporous film, non-woven glass, glass fiber materials and ceramic materials.

Suitable microporous films include a polyethylene membrane commercially available under the designation SOLUPOR®, (DMS Solutech); a polytetrafluoroethylene membrane commercially available under the designation ZITEX®, (Chemplast Inc.) or EXCELLERATOR®, (W. L. Gore and Associates); a polypropylene membrane commercially available under the designation CELGARD®, (Celgard LLC); and a membrane commercially available under the designation DEXIGLAS®, (C. H. Dexter, Div., Dexter Corp.). Cellulose based separators also typically used in capacitors are contemplated by the scope of the present invention. Depending on the electrolyte used, the separator can be treated to improve its wettability, for example with a surfactant, as is well known by those skilled in the art.

After fabrication of the anode pack 18 and cathode 40 is completed, they are engaged or associated with each other to form an anode/cathode assembly 52. Referring again to FIG. 2, the anode pack 18 and cathode 40 are assembled together to form the anode/cathode assembly 52 as indicated by arrow 54. Current collector 44 is fitted within the gap 30 between anodes 20 and 22, and current collector 46 is fitted within the gap 32 between anodes 22 and 24.

Referring also to FIG. 5, the anode/cathode assembly 52 is then positioned inside the first casing member 14 with the feedthrough wire 38 extending outside thereof. A flat strip 58 of insulative material is preferably disposed between the surrounding side wall 17 of the first casing member 14 and the anode/cathode assembly 52, thereby forming an insulating ring around the assembly 52. This helps prevent damage to the anode/cathode assembly 52 when the casing members 12, 14 are laser welded to each other. A glass-to-metal seal 56 is sealed within a through hole in the side wall 17 of the first casing member 14, thereby electrically insulating the feedthrough wire 38 therefrom. Suitable glasses for glass-to-metal seal 56 are, for example, ELAN® type 88 or MANSOL® type 88. Cathode 40 is electrically connected to the casing 12 by welding tab 50 of current collector 42 to first casing member 14. The first casing member 14 is then secured and hermetically sealed by welding to the second casing member 16 to provide an enclosure (i.e. the sealed casing 12) containing the anode/cathode assembly 52.

Next, working electrolyte (not shown) is delivered into the void volume in the casing 12 to operatively associate the cathode 40 with the anodes 20, 22 and 24. The electrolyte is filled through a fill opening 57 (FIG. 1). This hole is then welded closed with a metallic plug 57A to complete the sealing process. A suitable working electrolyte for the capacitor 10 is described in U.S. Pat. No. 6,219,222 to Shah et al., which includes a mixed solvent of water and ethylene glycol having an ammonium salt dissolved therein. U.S. Pat. No. 6,687,117 to Liu and U.S. Patent Application Pub. No. 2003/0090857 describe other electrolytes for the present capacitor 10. The electrolyte of the latter publication comprises water, a water-soluble inorganic and/or organic acid and/or salt, and a water-soluble nitro-aromatic compound while the former relates to an electrolyte having de-ionized water, an organic solvent, isobutyric acid and a concentrated ammonium salt. These patents and publications are assigned to the assignee of the present invention and incorporated herein by reference.

FIG. 6 is a cross-sectional view of the finished capacitor 10 made according to the present invention. Further details of the active materials and spatial relationships of the cathode and anodes will now be described.

The first cathode current collector 42 of cathode 40 is disposed between the face wall 60 of the first casing member 14 and the first anode 20. The current collector 42 includes a first major face 62 provided with cathode active material 64 thereupon opposed to the first anode 20. The second cathode current collector 44 is disposed between the first anode 20 and the second anode 22 and includes opposed first and second major faces 66 and 68 provided with cathode active material 64 thereon. The third cathode current collector 46 is disposed between the second anode 22 and the third anode 24 and includes opposed first and second major faces 70 and 72 provided with cathode active material 64 thereon. The fourth cathode current collector 48 is disposed between the face wall 19 of the second casing member 16 and the third anode 24. The current collector 48 includes a first major face 74 provided with cathode active material 64 thereupon opposed to the third anode 24. For both the first and fourth current collectors 42, 48, the cathode active material 64 is preferably not provided on the outer major faces that are opposed to face walls 60 and 19 of the casing members 14 and 16. If cathode active material were provided on these face walls, it would not interact significantly with anodes 20 and 24, and would thus be wasted material.

As described previously, the capacitor 10 preferably comprises separators of electrically insulative material that completely surround and envelope the cathode current collectors and their respective cathode active materials. Cathode 40 comprises a first separator 76 enclosing the first cathode current collector 42, a second separator 78 enclosing the second cathode current collector 44, a third separator 80 enclosing the third cathode current collector 46, and a fourth separator 82 enclosing the fourth cathode current collector 48. The separators 76, 78, 80 and 82 may be formed as pouches that envelope the current collectors. In particular, each of the separators is sealed at a flap (not shown) that extends around the majority of the perimeter of the current collectors. The individual sheets of separator material are closed at their respective flaps by a process such as ultrasonic welding, or heat sealing. For further protection of the separator material at the current collector edges, the perimeter of the anode/cathode assembly can be sealed with a hot melt polymer (not shown).

The cathode active material 64 has a thickness of from about a few hundred Angstroms to about 0.1 millimeters directly coated on the major faces of the current collectors 42, 44, 46 and 48. The current collectors may be of an anodized-etched conductive material, or have a sintered active material with or without oxide contacted thereto, or be contacted with a double layer capacitive material, for example a finely divided carbonaceous material such as graphite or carbon or platinum black, or be contacted with a redox, pseudocapacitive or an under potential material, or an electroactive conducting polymer such as polyaniline, polypyrrole, polythiophene, and polyacetylene, and mixtures thereof.

According to one preferred aspect of the present invention, the redox or cathode active material includes an oxide of a metal, a nitride of the metal, a carbon nitride of the metal, and/or a carbide of the metal, the oxide, nitride, carbon nitride and carbide having pseudocapacitive properties. The metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and lead.

The cathode active material 64 coated on the major faces of the current collectors is preferably coated by a pad printing process, as disclosed in U.S. Pat. No. 7,116,547 to Seitz et al. This patent is assigned to the assignee of the present invention and incorporated herein by reference. An ultrasonically generated aerosol as described in U.S. Pat. Nos. 5,894,403, 5,920,455, 6,224,985, and 6,468,605, all to Shah et al., is also suitable for making a coating of the active materials. These patents are also assigned to the assignee of the present invention and incorporated herein by reference.

The mating casing members 14 and 16 and the foil substrate of the current collectors 42, 44, 46 and 48 are preferably selected from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. Preferably, the face and side walls of the casing members 14 and 16 and the current collectors 42, 44, 46 and 48 have a thickness of from about 0.001 to about 2 millimeters.

The capacitor assembly of the present invention is not limited solely to a three anode/four cathode structure. In one embodiment (not shown), the anode pack is comprised of two anodes connected to the bridge. The corresponding cathode is comprised of a first, a second and a third cathode current collectors. The first cathode current collector is disposed between the first casing member and the first anode, and includes a first major face provided with cathode active material thereupon opposed to the first anode. The second cathode current collector is disposed between the first and second anodes and includes opposed first and second major faces provided with cathode active material thereon. The third cathode current collector is disposed between the second casing member and the second anode, and includes a first major face provided with cathode active material thereupon opposed to the second anode. In summary, this dual anode/triple cathode capacitor is analogous in structure to the capacitor 10 of FIGS. 1 to 6, but has one less anode and cathode pair.

It will be apparent that further analogous embodiments may be provided with the anode pack comprising more than three anodes, and the cathode comprising more than four current collectors with cathode active material. In general, capacitors according to the present invention are comprised of N anodes and (N+1) cathode current collectors, wherein $N \geq 2$. In any such capacitor, the anode pack is comprised of N anodes of anode active material connected to a bridge. The first cathode current collector is disposed between the first casing member and the first anode, and includes a first major face provided with cathode active material thereupon opposed to the first anode. The second cathode current collector through the $N^{th}$ cathode current collector are disposed respectively between the first and the $N^{th}$ anodes and have opposed first and second major faces provided with cathode active material thereon. The $(N+1)^{th}$ cathode current collector is disposed between the second casing member and the $N^{th}$ anode, and includes a first major face provided with cathode active material thereupon opposed to the $N^{th}$ anode.

In the capacitor 10 depicted in FIGS. 1 to 6, the feedthrough wire 38 of the capacitor assembly is electrically connected to the bridge 26 of the anode pack 18. Alternatively, the feedthrough wire may be connected to one of the anodes. In one such embodiment depicted in FIGS. 7 and 8, one of the anodes, for example anode 104, includes a plate 126 electrically connected to a face wall thereof, and the feedthrough wire 130 is electrically connected to the plate. Capacitor 90 is similar in structure to capacitor 10 of FIGS. 1 to 6, and is comprised of a casing 92 including first and second casing members 94 and 96 secured to each other, an anode pack 98 housed within the casing and comprising two or more anodes of anode active material electrically connected to each other by a bridge 124, and a cathode comprised of cathode current collectors including major faces with cathode active material provided thereupon. The first casing member 94 includes a first face wall 95 joined to a surrounding side wall 97. The second casing member 96 includes a second face wall 99 secured to the surrounding side wall 97 of the first casing member 94. In general, capacitor 90 may be provided in a configuration having N anodes and (N+1) cathode current collectors.

Figure 7:
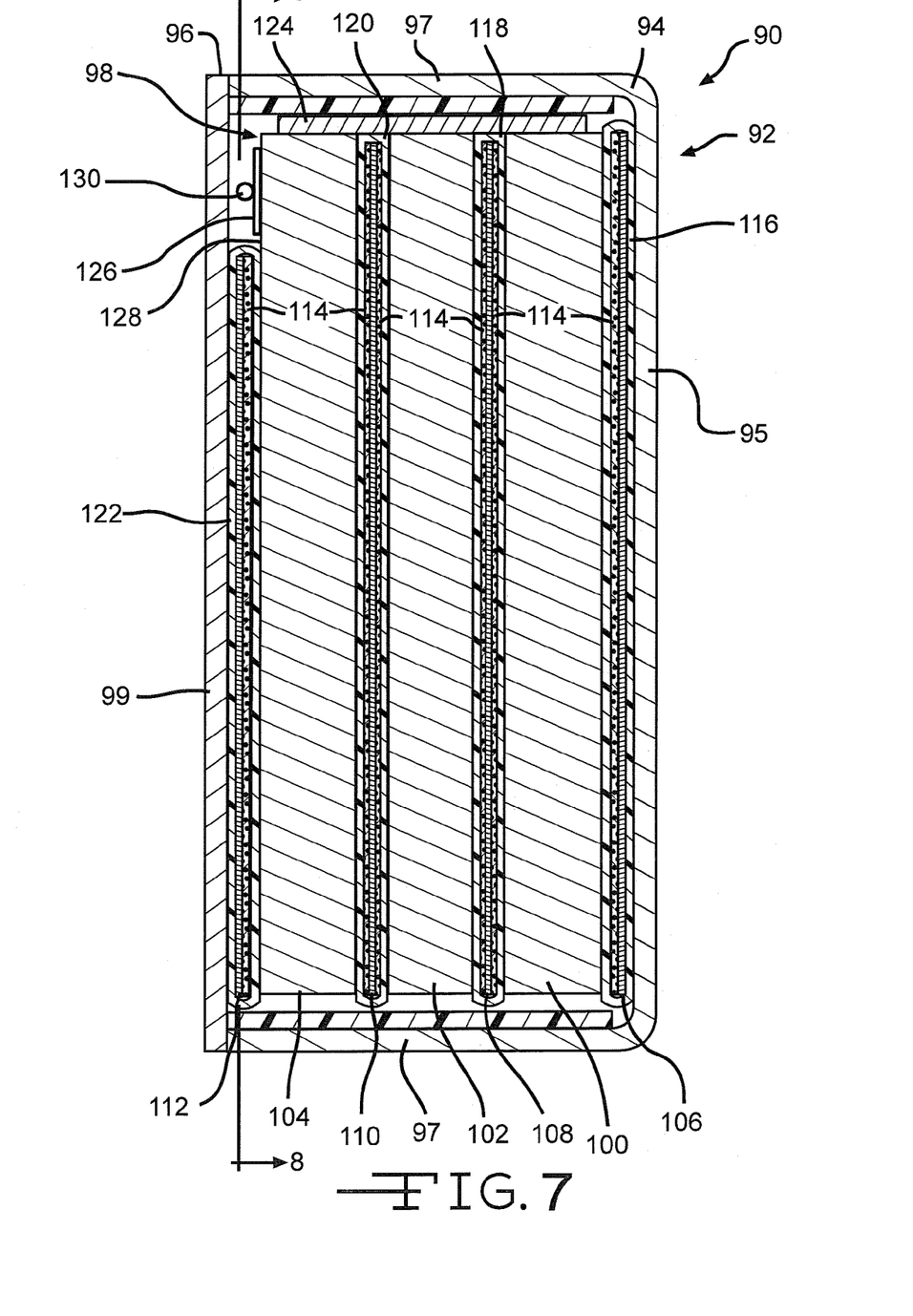
FIG. 7 is an end view of an alternative embodiment of a capacitor 90, wherein electrical contact with the anode pack 98 is made at a plate 126 that is pressed into the surface of one of the anode pellets 104.
Figure 8:
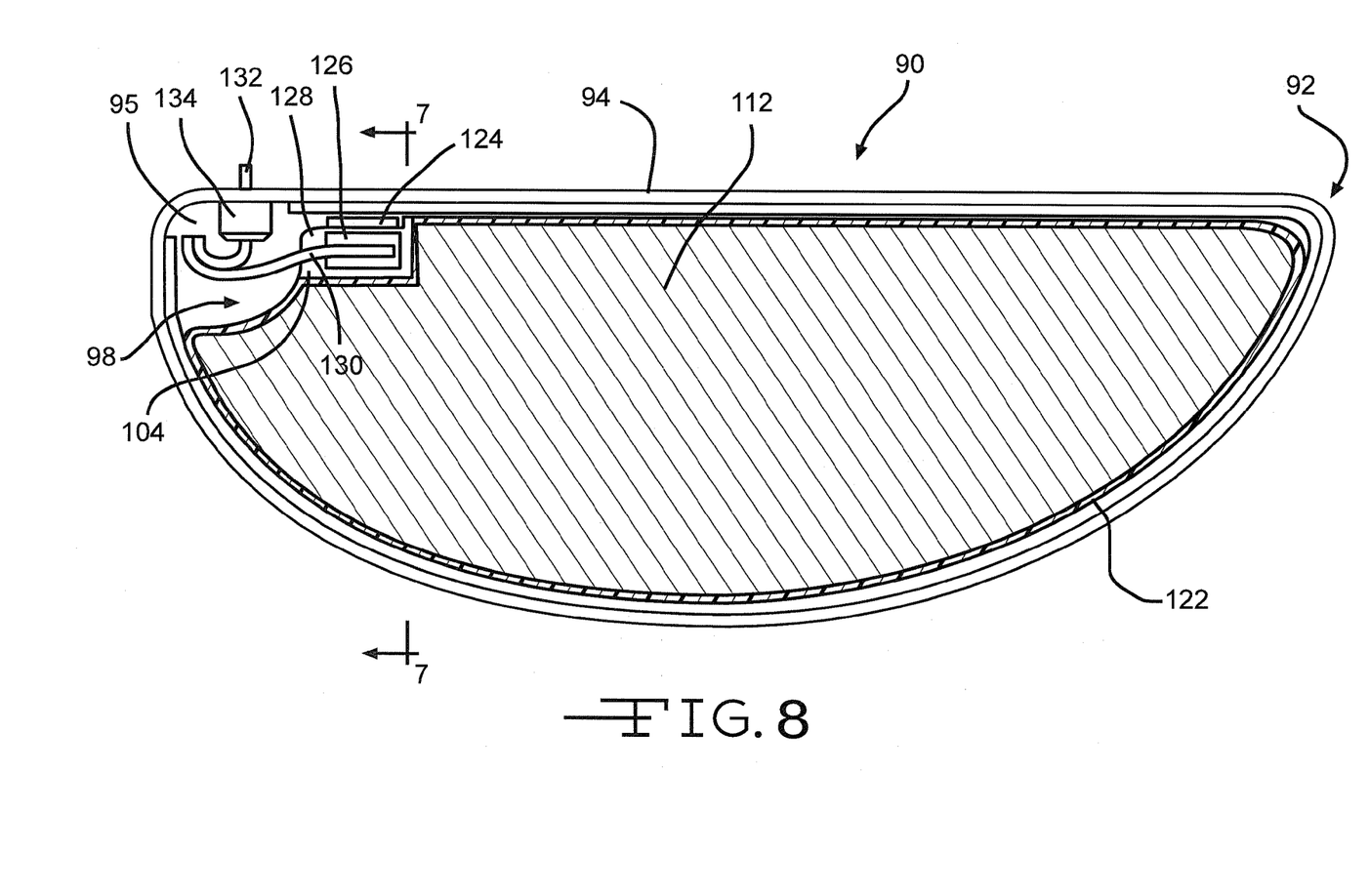
FIG. 8 is a cross-sectional view taken along line 8-8 of FIG. 7.

More particularly, the anode pack 98 in FIGS. 7 and 8 is comprised of three anodes 100, 102 and 104. The cathode of capacitor 90 is comprised of four cathode current collectors 106, 108, 110 and 112 coated with cathode active material 114. Cathode current collectors 106, 108, 110 and 112 are encased in separators 116, 118, 120 and 122, respectively. The relationships of the cathode current collectors 116, 118, 120 and 122 and the cathode active material 114 provided thereon to the anodes 100, 102 and 104 is the same as described for capacitor 10 of FIGS. 1 to 6, and will not be described further herein.

Anodes 100, 102 and 104 are connected to each other by a bridge 124, which is joined to the anodes by welding as previously described herein. Anode 104 is provided with a small plate 126 of foil that is joined to the outer face wall 128 thereof, preferably during the pressing and sintering processes of forming the anode pellet, or by welding thereafter. A feedthrough wire 130 may be electrically connected to the anode pack and extends outside the casing and is electrically isolated there from. In the embodiment depicted in FIG. 7, wire 130 is an intermediate wire that is connected to a J-shaped feedthrough wire 132, which is sealed to the sidewall 97 of casing member 94 by a glass-to-metal seal 134.

Figure 9:
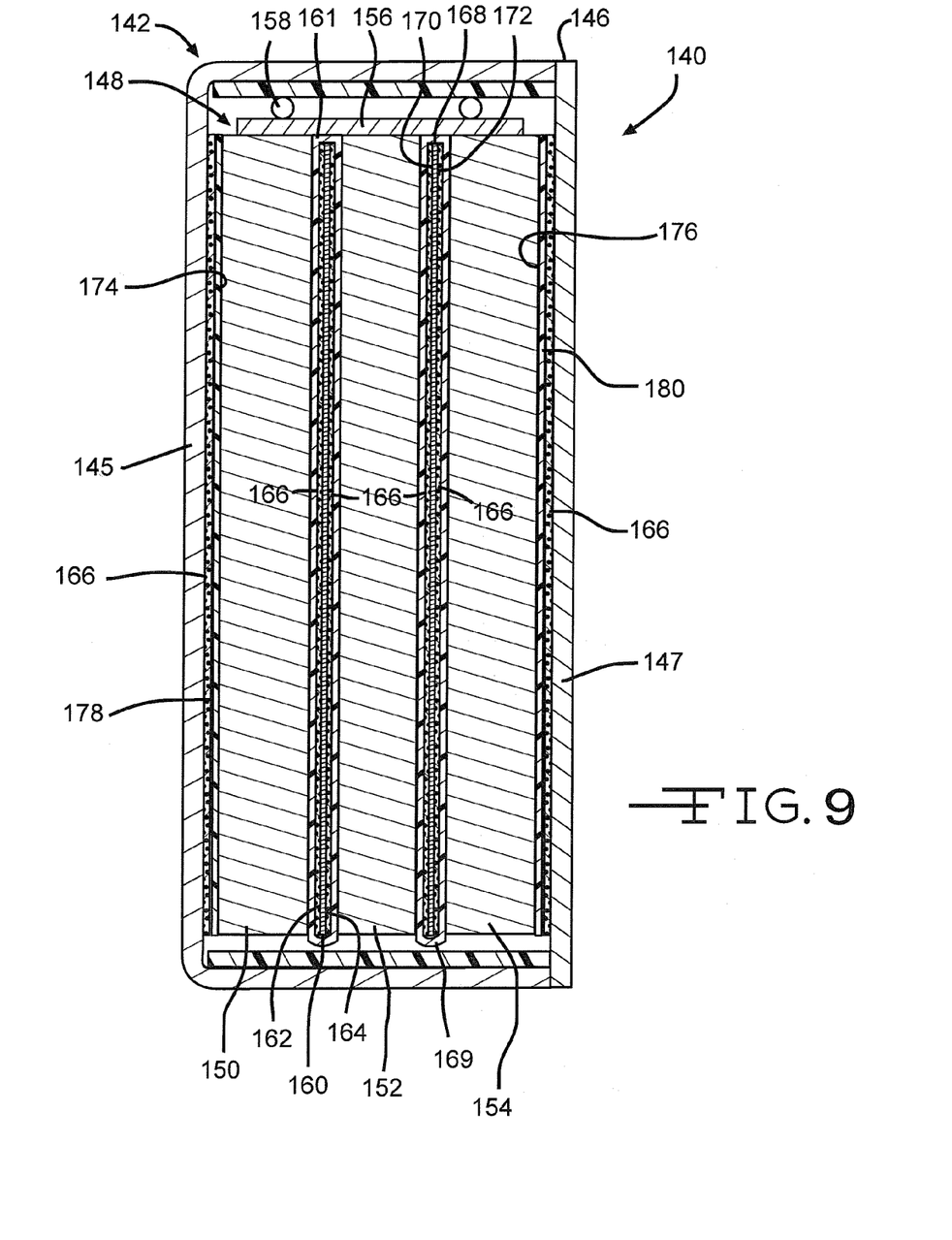
FIG. 9 is a cross-sectional view of an alternative capacitor 140 of the present invention in which a portion of the cathode is provided on the face walls of the casing members.

In another embodiment, the capacitor assembly is provided in a configuration in which a portion of the cathode is provided on the face walls of the casing members. Referring to FIG. 9, capacitor 140 is comprised of a casing 142 including first and second casing members 144 and 146 secured to each other, an anode pack 148 housed within the casing and comprising two or more anodes of anode active material electrically connected to each other by a bridge and electrically associated with a cathode comprised of cathode current collectors including major faces with cathode active material provided thereupon as well as being provided on the face walls of the casing members.

In the most general sense for capacitor 140, the anode pack 148 thereof is comprised of N anodes. The cathode is comprised of (N−1) current collectors disposed in the spaces between the N anodes, with cathode active material provided on the major face walls thereof. The cathode is further comprised of the face walls 145 and 147 of casing members 144 and 146, which are also provided with cathode active material. Functionally, this configuration results in a capacitor assembly similar to the one having N anodes and (N+1) cathode current collectors as described previously herein and shown in FIGS. 1 to 6.

In the embodiment depicted in FIG. 9, the capacitor 140 is comprised of an anode pack 148 including three anodes 150, 152 and 154 electrically connected to each other by a bridge 156. A feedthrough wire 158 is electrically connected to the bridge 156 and extends outside the first casing member 144. The feedthrough wire 158 is also electrically isolated from the first casing member 144 by a glass-to-metal seal (not shown), as previously described. Alternatively, one of anodes 150 or 154 may be provided with a small plate (not shown) secured to an outer face wall thereof as described previously for capacitor 90 of FIGS. 7 and 8. The feedthrough wire 158 is connected to that plate.

A first part of the corresponding cathode of capacitor 140 is comprised of a first cathode current collector 160 disposed between the first and second anodes 150 and 152 and having opposed first and second major faces 162 and 164 provided with cathode active material 166 thereon, and a second cathode current collector 168 disposed between the second and third anodes 152 and 154 and having opposed first and second major faces 170 and 172 provided with cathode active material 166 thereon. Cathode current collectors 160 and 168 may be formed in a U-shape from a single piece of foil and connected to each other by a narrow band of the foil as described previously herein. If the capacitor 140 is comprised of four or more anodes, and three or more corresponding cathode current collectors, such current collectors may be formed in a serpentine shape as described previously. Cathode current collectors 160 and 168 are preferably enveloped within pouches of separator 161 and 169, respectively, as described previously herein.

The remaining part of the cathode of capacitor 140 is comprised of the face wall 145 of the first casing member 144 provided with cathode active material 166 opposing the outer face 174 of the first anode 150, and the face wall 147 of the second casing member 146 provided with cathode active material 166 opposing the outer face 176 of the third anode 154. A sheet of separator 178 is disposed between the face wall 145 of the first casing member 144 and outer face 174 of first anode 150. In like manner, a sheet of separator 178 is disposed between the face wall 147 of the second casing member 146 and the outer face 176 of third anode 154.

Thus, the present invention provided an improved capacitor and method for making a capacitor. The improvement is in large part the result of the use of a bridge connected to a plurality of aligned and uniformly spaced apart anode pellets. The evenly maintained spacing provides for moving a cathode between opposed anodes or between an anode and a case sidewall to provide an anode/cathode assembly. Such an assembly readily lends itself to automation. This, of course, means that the present capacitors can be produced with improved efficiency and with more predictable discharge characteristics.

It is, therefore, apparent that there has been provided, in accordance with the present invention, a capacitor assembly comprising a casing, an anode pack comprising two or more anodes electrically connected to each other by a bridge, and a cathode comprised of cathode current collectors including major faces with cathode active material. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A capacitor, which comprises:
    a) a casing comprising first and second casing members secured to each other;
    b) an anode housed within the casing and comprising a first anode pellet of anode active material, a second anode pellet of anode active material, and a bridge electrically connected to the first and second anode pellets;
    c) a feedthrough wire electrically connected to the anode and extending outside the casing in electrical isolation there from;
    d) a cathode comprising a first cathode current collector disposed between the first and second anode pellets and having opposed first and second major faces provided with cathode active material thereon to thereby provide an anode/cathode assembly, wherein the first cathode current collector is electrically connected to the casing;
    e) a separator disposed between the anode and the cathode to prevent direct physical contact between them; and
    f) an electrolyte contacting the cathode and the anode.

2. The capacitor of claim 1 further comprising a second cathode current collector disposed between the first casing member and the first anode and including a major face provided with cathode active material thereupon opposed to the first anode and a third cathode current collector disposed between the second casing member and the second anode and including a major face provided with cathode active material thereupon opposed to the second anode to thereby provide the anode/cathode assembly, wherein the first, second and third cathode current collectors are electrically connected to each other and to the casing.

3. The capacitor of claim 1 wherein the first and second anode pellets each comprise respective first and second surrounding sidewalls extending to spaced apart major anode face walls and wherein the first and second anode pellets are aligned in a generally parallel relationship with the bridge spanning from the first anode pellet surrounding sidewall to the second anode pellet surrounding sidewall and oriented generally perpendicular to the respective spaced apart major anode face walls.

4. The capacitor of claim 1 wherein the bridge includes registration marks to ensure that the first and second anode pellets are properly aligned with respect to each other.

5. The capacitor of claim 1 wherein the feedthrough wire is electrically connected to the bridge.

6. The capacitor of claim 1 wherein the feedthrough wire is electrically connected to one of the anode pellets.

7. The capacitor of claim 1 wherein a plate is electrically connected to a face wall of one of the first and second anode pellets, and the feedthrough wire is electrically connected to the plate.

8. The capacitor of claim 1 wherein the first casing member has a first face wall joined to a surrounding side wall and the second casing member has a second face wall secured to the surrounding side wall of the first casing member.

9. The capacitor of claim 7 further comprising an insulating ring disposed between the surrounding side wall of the first casing member and the anode/cathode assembly.

10. The capacitor of claim 2 wherein the first, second and third cathode current collectors are formed from a single piece of foil arranged in a serpentine manner between the first and second anodes and the respective first and second casing members.

11. The capacitor of claim 2 further comprising a first separator enveloping the first cathode, a second separator enveloping the second cathode, and a third separator enveloping the third cathode.

12. The capacitor of claim 1 wherein the feedthrough wire is insulated from the casing by a glass-to-metal seal.

13. The capacitor of claim 1 wherein the anode active material is selected from the group consisting of tantalum, aluminum, titanium, niobium, zirconium, hafnium, tungsten, molybdenum, vanadium, silicon, germanium, and mixtures and alloys thereof, and the cathode active material is selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead, gold, silver, and mixtures, oxides and nitrides thereof.

14. A capacitor, which comprises:
 a) a casing comprising first and second casing members secured to each other;
 b) an anode pack housed within the casing and comprising N anodes of anode active material electrically connected to each other by a bridge;
 c) a feedthrough wire electrically connected to the anode pack and extending outside the casing in electrical isolation there from;
 d) a cathode comprising (N+1) cathode current collectors;
 e) a separator disposed between the anode and the cathode to prevent direct physical contact between them;
 f) an electrolyte contacting the cathode and the anode pack, wherein N is at least 2; and
 g) wherein a first cathode current collector is disposed between the first casing member and a first anode and includes a first major face provided with cathode active material thereupon opposed to the first anode, a second cathode current collector through an $N^{th}$ cathode current collector is disposed respectively between the first and an $N^{th}$ anode and has opposed first and second major faces provided with cathode active material thereon, and an $(N+1)^{th}$ cathode current collector disposed between the second casing member and the $N^{th}$ anode includes a first major face provided with cathode active material thereupon opposed to the $N^{th}$ anode.

15. The capacitor of claim 14 wherein the first and second anodes each comprise respective first and second surrounding sidewalls extending to spaced apart major anode face walls and wherein the first and second anodes are aligned in a generally parallel relationship with the bridge spanning from the first anode surrounding sidewall to the second anode surrounding sidewall and oriented generally perpendicular to the respective spaced apart major anode face walls.

16. The capacitor of claim 14 wherein the bridge includes registration marks to ensure that the N anodes are properly aligned with respect to each other.

17. A capacitor comprises:
 a) a casing comprising first and second casing members secured to each other;
 b) an anode pack housed within the casing and comprising N anodes of anode active material electrically connected to each other by a bridge;
 c) a feedthrough wire electrically connected to the anode pack and extending outside the casing in electrical isolation there from;
 d) a cathode comprising (N−1) cathode current collectors;
 e) a separator disposed between the anode and the cathode to prevent direct physical contact between them;
 f) an electrolyte contacting the cathode and the anode pack; and
 g) wherein N is at least 2, and wherein the first cathode current collector through the $(N-1)^{th}$ cathode current collector are disposed respectively between the first and the $N^{th}$ anode and have opposed first and second major faces provided with cathode active material thereon.

18. The capacitor of claim 17 wherein the cathode is further comprised of cathode active material provided on a first face wall of the first casing member opposed to the first anode and on a second face wall of the second casing member opposed to the $N^{th}$ anode.

19. The capacitor of claim 17 wherein the cathode is further comprised of an $N^{th}$ cathode current collector disposed between the first casing member and the first anode, and including a first major face provided with cathode active material thereupon opposed to the first anode, and wherein the cathode is further comprised of an $(N+1)^{th}$ cathode current collector disposed between the second casing member and the $N^{th}$ anode, and including a first major face provided with cathode active material thereupon opposed to the $N^{th}$ anode.

20. The capacitor of claim 17 wherein the bridge includes registration marks to ensure that the N anodes are properly aligned with respect to each other.

21. A method for providing a capacitor, comprising the steps of:
 a) providing a casing comprising a first casing member including a first face wall joined to a surrounding side wall and a second casing member including a second face wall;
 b) providing an anode comprising a first anode pellet of anode active material, a second anode pellet of anode active material, and a bridge electrically connected to the first and second anode pellets;
 c) connecting a feedthrough wire to the anode;
 d) disposing a cathode comprising first, second and third cathode current collectors having major faces provided with cathode active material such that the first cathode current collector is adjacent to the first anode pellet, the second cathode current collector is between the first and second anode pellets, and the third cathode current collector is adjacent to the second anode pellet, thereby forming an anode/cathode assembly, wherein the anode and the cathode are prevented from direct physical contact with each other by a separator;
 e) positioning the anode/cathode assembly inside the first casing member with the feedthrough wire extending outside thereof and electrically insulating there from;
 f) electrically connecting the cathode to the casing;
 g) securing the first casing member to the second casing member to provide the casing as an enclosure housing the anode/cathode assembly; and
 h) providing an electrolyte inside the casing contacting the cathode and the anode housed inside the casing.

22. The method of claim 21 including providing the first and second anode pellets each comprising respective first and second surrounding sidewalls extending to spaced apart major anode face walls and aligning the first and second anode pellets in a generally parallel relationship with the bridge spanning from the first anode pellet surrounding sidewall to the second anode pellet surrounding sidewall oriented generally perpendicular to the respective spaced apart major anode face walls.

23. The method of claim 21 including ensuring proper alignment of the N anodes with respect to each other using registration marks on the bridge.

24. The method of claim 21 including connecting the feedthrough wire to the bridge of the anode pack.

25. The method of claim 21 including joining a plate to a face wall of the first anode pellet, and wherein the feedthrough wire is connected to the plate.

26. The method of claim 21 including forming the first, second and third current collectors from a single piece of foil arranged in a serpentine manner between the first and second anodes and the respective first and second casing members.

27. The method of claim 21 including enclosing the first cathode in a first separator, the second cathode in a second separator, and the third cathode in a third separator.

* * * * *